(12) United States Patent
Asama et al.

(10) Patent No.: US 11,302,035 B2
(45) Date of Patent: Apr. 12, 2022

(54) PROCESSING IMAGES USING HYBRID INFINITE IMPULSE RESPONSE (IIR) AND FINITE IMPULSE RESPONSE (FIR) CONVOLUTION BLOCK

(71) Applicant: INTEL CORPORATION, Santa Clara, CA (US)

(72) Inventors: Masayoshi Asama, San Jose, CA (US); Furkan Isikdogan, Santa Clara, CA (US); Sushma Rao, Sunnyvale, CA (US); Avi Kalderon, Holon (IL); Chyuan-Tyng Wu, San Jose, CA (US); Bhavin Nayak, Santa Clara, CA (US); Joao Peralta Moreira, Montain View, CA (US); Pavel Kounitsky, Holon (IL); Ben Berlin, Kfar Saba (IL); Gilad Michael, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 108 days.

(21) Appl. No.: 16/674,512

(22) Filed: Nov. 5, 2019

(65) Prior Publication Data
US 2020/0074691 A1 Mar. 5, 2020

Related U.S. Application Data

(60) Provisional application No. 62/896,967, filed on Sep. 6, 2019.

(51) Int. Cl.
*G06T 9/00* (2006.01)
*G06T 3/40* (2006.01)
(Continued)

(52) U.S. Cl.
CPC ............... *G06T 9/002* (2013.01); *G06T 1/20* (2013.01); *G06T 3/4015* (2013.01);
(Continued)

(58) Field of Classification Search
None
See application file for complete search history.

(56) References Cited

U.S. PATENT DOCUMENTS 7,565,020 B2 * 7/2009 Wu ...................... H04N 19/147
348/394.1
10,430,913 B2 * 10/2019 Chen ...................... G06T 5/002
(Continued)

OTHER PUBLICATIONS

Liu, Sifei, Jinshan Pan, and Ming-Hsuan Yang. "Learning recursive filters for low-level vision via a hybrid neural network." European Conference on Computer Vision. Springer, Cham, 2016. (Year: 2016).*

(Continued)

*Primary Examiner* — Andrae S Allison
(74) *Attorney, Agent, or Firm* — Hanley, Flight & Zimmerman, LLC

(57) ABSTRACT

An example apparatus for processing images includes a hybrid infinite impulse response-finite impulse response (IIR-FIR) convolution block to receive an image and generate processed image information. The hybrid IIR-FIR convolution block includes a vertical infinite impulse response (IIR) component to approximate a vertical convolution when processing the image.

19 Claims, 7 Drawing Sheets

(51) Int. Cl.
  *G06T 1/20*  (2006.01)
  *G06T 5/00*  (2006.01)
  *G06T 5/20*  (2006.01)
(52) U.S. Cl.
  CPC ............ *G06T 3/4046* (2013.01); *G06T 5/002* (2013.01); *G06T 5/003* (2013.01); *G06T 5/009* (2013.01); *G06T 5/20* (2013.01); *G06T 2207/10024* (2013.01); *G06T 2207/20081* (2013.01); *G06T 2207/20084* (2013.01)

(56) References Cited

U.S. PATENT DOCUMENTS

| | | | | |
|---|---|---|---|---|
| 10,783,622 | B2* | 9/2020 | Wang | G06T 5/002 |
| 2014/0219558 | A1* | 8/2014 | Teng | H04N 19/186 |
| | | | | 382/166 |
| 2016/0048947 | A1* | 2/2016 | Lakshman | G06T 3/4053 |
| | | | | 382/276 |
| 2017/0177931 | A1* | 6/2017 | Fang | G06T 3/40 |
| 2017/0262995 | A1* | 9/2017 | Li | G06N 3/0454 |
| 2018/0204314 | A1* | 7/2018 | Kaplanyan | G06T 1/20 |
| 2019/0005360 | A1* | 1/2019 | Heide | G06T 5/001 |
| 2019/0130217 | A1* | 5/2019 | Wu | G06K 9/4628 |
| 2020/0020134 | A1* | 1/2020 | Tsukuba | H04N 19/159 |

OTHER PUBLICATIONS

Tsuei, Danny Teng-Hsiang. 2D Digital Filter Implementation on a FPGA. MS thesis. University of Waterloo, 2011. (Year: 2011).*
Suresh et al, FPGA Implementation of a New Parallel FIR Filter Structures, International Journal of Modern Engineering Research (IJMER), www.ijmer.com vol. 2, Issue.5, Sep.-Oct. 2012 pp. 3437-3441 (Year: 2012).*
Saeedan, Faraz, et al. "Detail-preserving pooling in deep networks." Proceedings of the IEEE Conference on Computer Vision and Pattern Recognition. 2018. (Year: 2018).*
Deriche, Rachid. "Fast algorithms for low-level vision." IEEE transactions on pattern analysis and machine intelligence 12.1 (1990): 78-87. (Year: 1990).*
Nguyen, Viet-Anh, Yap-Peng Tan, and Weisi Lin. "Adaptive downsampling/upsampling for better video compression at low bit rate." 2008 IEEE International Symposium on Circuits and Systems (ISCAS). IEEE, 2008. (Year: 2008).*
Asama, Masayoshi, et al. "A machine learning imaging core using separable FIR-IIR filters."arXiv preprint arXiv:2001.00630 (2020). (Year: 2020).*
Mody et al., "Efficient Pre-Processor for CNN" Conference: 2017 IEEE International Conference on Consumer Electronics—Asia (ICCE—Asia) pp. 50-53.
Wu, et al., "SqueezeDet: Unified, Small, Low Power Fully Convolutional Neural Networks for Real-Time Object Detection for Autonomous Driving", Computer Science > Computer Vision and Pattern Recognition, Submitted Dec. 2016 last revised Nov. 2017, arXiv:1612.01051, 9 pages.
Geiger et al., "Are we ready for Autonomous Driving? The KITTI Vision Benchmark Suite" 2012 IEEE Conference on Computer Vision and Pattern Recognition; Date of Conference Jun. 16-21, 2012 Providence RI USA, 8 pages.
Tensorflow: "tensortlow::ops::FakeQuantWithMinMaxArgs" Retrieved from the Internet on Feb. 19, 2019; https://www.tensorflow.org/api_docs/cc/class/tensorflow/ops/fake-quant-with-min-max-args, 3 pages.
Hegarty et al., "Darkroom: Compiling High-Level Image Processing Code into Hardware Pipelines" ACM Transactions on Graphics (TOG) TOG Homepage ,vol. 33 Issue 4, Jul. 2014, Article No. 144, ACM New York, NY, USA 11 pages.
Heide et al., :"FlexISP: A Flexible Camera Image Processing Framework"; Published in: Proc. ACM SIGGRAPH Asia, vol. 33 Issue 6, Nov. 2014 , Article No. 231, New York NY USA, 13 pages.
Chen et al., "Fast Image Processing with Fully Conventional Networks", 2017 IEEE International Conference on Computer Vision (ICCV), Oct. 2017, Stanford University USA, 10 pages.
Gharbi et al., "Deep Bilateral Learning for Real-Time Image Enhancement", ACM Transactions on Graphics, vol. 36 Issue 4, Jul. 2017, Article No. 118 , New York, NY USA ,12 pages.
Ronneberger et al.,"U-net: Convolutional networks for biomedical image segmentation. In International Conference on Medical image computing and computer-assisted intervention", International Conference on Medical Image Computing and Computer-Assisted Intervention Nov. 2015 pp. 234-241. Freibrurg, Germany, 8 pages.
Whatmough et al.,"FIXYNN: Efficient Hardware for Mobile Computer Vision via Transfer Learning" Conference: SysML Mar. 2019 Conference on Systems and Machine Learning (SysML), 13 pages.

* cited by examiner

100

400

500

PROCESSING IMAGES USING HYBRID INFINITE IMPULSE RESPONSE (TTR) AND FINITE IMPULSE RESPONSE (FIR) CONVOLUTION BLOCK

CROSS REFERENCE TO RELATED APPLICATION

The present application claims the benefit of the filing date of U.S. Provisional Patent Application No. 62/896,967, filed Sep. 6, 2019, which is incorporated herein by reference.

BACKGROUND

Convolutional neural networks (CNNs) may be trained on training images to process images. For example, CNNs can be trained to make dense, pixel-wise predictions to generate processed images.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
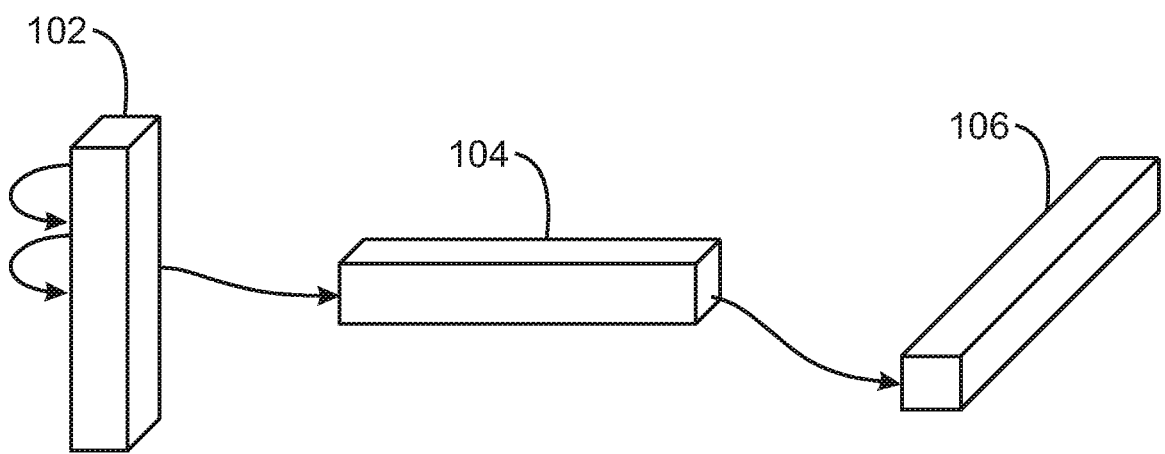
FIG. 1 is a block diagram illustrating an example hybrid IIR-FIR convolution block broken down into three separable convolutions with IIR and FIR filters.

As discussed above, CNNs may be trained to generate processed images. For example, many convolutional neural network (CNN) architectures that make dense, pixel-wise predictions, such as U-Net and its variants, use very long skip lines. These skip lines are used to recover details lost during down sampling within the CNN. However, hardware implementations of these networks may use a large amount of memory to hold these skip lines, which may dramatically increase cost of implementing the CNN on hardware. Furthermore, the skip connections may cause additional latency, which may hinder real-time applications of the CNN system. Moreover, in real-time imaging systems, images are acquired line-by-line by the raster scan order. Therefore, an efficient hardware implementation of a CNN that runs in such a system may be fully pipelined. However, it may be challenging to implement a CNN topology that has long skip connections in fully-pipelined hardware in a cost-effective way. The main reason is that skip lines, which are used for image processing applications, are used to compensate for all vertical delays of the entire network.

For example, in a line based system, the vertical line delay is accumulated in every convolution layer. For example, a 3×3 spatial window may cause a 1-line delay, whereas two consecutive 3×3 convolutions may result in a 2-line delay. However, once the data on one end of the skip line is generated, the data needs to be held in memory until the data in the receiving end of the skip connection is ready. The more layers a connection skips over, the more lines may need to be kept in memory. Therefore, the size of the total memory used may increase with the length of the skip line. The memory requirements for the skip lines may thus aggregate quickly and become a significant contributor to the total silicon area used to implement the network. Moreover, the latency caused by the accumulated line delay may also be problematic in latency-sensitive applications such as autonomous driving systems.

Moreover, although defining image processing operators as fixed-function ASIC blocks may improve the performance of a system, many algorithms can be still too complex to run on low power environments. In addition, implementing convolutional neural networks, such as a U-Net, as-is in hardware may be very costly.

The present disclosure relates generally to techniques for processing images. Specifically, the techniques described herein include an apparatus, method and system for processing images using a hybrid IIR-FIR convolution block. An example apparatus includes a hybrid infinite impulse response (IIR)—finite impulse response—(FIR) convolution block to receive an image and generate processed image information. For example, the generated processed image information may include images, depth maps, feature maps, or any other image information. The hybrid IIR-FIR convolution block includes a vertical IIR component to approximate a vertical convolution when processing the image. In various examples, the hybrid IIR-FIR convolution block also includes a horizontal FIR convolution. The hybrid IIR-FIR convolution block also further includes a pointwise FIR convolution.

The techniques described herein thus enable maintenance of a large receptive field without producing large vertical delay lines. Specifically, the techniques can significantly reduce memory used, while also reducing end-to-end latency by replacing some of the FIR filters with IIR filters and compressing the skip lines. For example, the IIR filters may specifically be used to approximate vertical convolutions.

In addition, the techniques described herein may be implemented as a multi-purpose image signal processor at any of multiple locations of an imaging pipeline to implement or complement certain features in pre-processing, post-processing, or anywhere in between in the imaging pipeline. Moreover, the techniques described herein can be used by devices to improve the image quality by learning a mapping between the outputs of low-cost and high-end image signal processors (ISPs). The techniques can also be used to approximate compute-heavy image processing operators, such as denoising and deblurring algorithms. In some examples, the techniques can be used to recover missing color information from the context, such as converting RCCC (Red/Clear) images used in advanced driver assistance systems to full color RGB images. For example, the full color RGB images can be displayed to drivers while backing up vehicles using existing RCCC sensors, rather than dedicated RGB sensors for this purpose. This may save costs of using multiple types of sensors. In various examples, the techniques can be used to process single or stereo camera inputs to create depth maps. In some examples, the techniques may be used to demosaic non-traditional color filter array images, such as RGB-IR, and spatially vary exposure levels.

FIG. 1 is a block diagram illustrating an example hybrid IIR-FIR convolution block broken down into three separable convolutions with IIR and FIR filters. The example hybrid IIR-FIR convolution block 100 can be implemented in the system 200, the residual hybrid IIR-FIR convolution block 222 of FIG. 3, or the computing device 600 in FIG. 6 using the method 500 of FIG. 5.

The example hybrid IIR-FIR convolution block 100 includes a vertical IIR component 102. For example, the vertical IIR component 102 may be a spatially recurrent convolution layer. The hybrid IIR-FIR convolution block 100 includes a horizontal FIR convolution 104 communicatively coupled to the vertical IIR component 102. For example, the horizontal FIR convolution 104 may be a 1×5 convolution. The system 100 also further includes a pointwise FIR convolution 106 communicatively coupled to the horizontal FIR convolution 104. For example, the pointwise FIR convolution 106 may be a 1×1×C convolution, where C is the number of channels.

As shown in FIG. 1, the hybrid IIR-FIR convolution block 100 includes three separable convolutions. The separable convolutions may be used to design efficient neural network architectures, particularly in the form of depthwise-separable convolutions. For example, depthwise-separable convolutions may replace a K×K× $C_{in}$×$C_{out}$ convolution with K×K convolutions for each input channel $C_{in}$, followed by a point-wise 1×1×$C_{in}$×$C_{out}$ convolution. Such depthwise separation may lead to significant savings in the number of parameters. In some examples, this kernel separability may be taken one step further to separate a K×K filter spatially as K×1 and 1×K filters. This type of spatial separation is not commonly used in modern convolutional neural network architectures, since spatial separation does not reduce the number of parameters significantly enough for small kernel sizes. However, such spatial separability may provide benefits when the kernels are large and the cost of horizontal and vertical convolutions are not the same.

As discussed above, in a line-based system, the cost of vertical convolutions may be disproportionally high due to the number of lines that need to be buffered before the convolution for a given window can be computed. For example, a 1×5 convolution may only have one element buffered, whereas a 5×1 convolution may have four lines of data buffered. The hybrid IIR-FIR convolution block 100 addresses this problem by replacing the vertical convolutions in a 3-way separable convolution layer with an IIR filter. The IIR filter may have an impulse response that does not become exactly zero past a certain point, but continues indefinitely. An impulse response, as used herein, refers to the output of a filter when presented with a brief input signal, referred to as an impulse. The IIR filter may be a recurrent module that takes the previous outputs and processes current output. An IIR filter is thus not limited to any fixed size window, as it uses previously processed information at every step of processing.

For example, using an IIR filter in the vertical direction, the hybrid IIR-FIR convolution block 100 can approximate a convolution without producing vertical delay lines. In various examples, a first-order IIR may be used to approximate a vertical (N×1) convolution. In some examples, this operator may be implemented as a spatially-recurrent neural network cell using the Equation:

$$h[t]=h[t-1]w1+x[t-1]w2+x[t]w3 \qquad \text{Eq. 1}$$

where x is the input, h is the output, w stands for the trainable weights, and t indicates the spatial position in the vertical axis. Recurrent modules may usually be used to train machine learning models on time series data. However, as indicated by looping arrows in the vertical IIR component 102 of the hybrid IIR-FIR convolution block 100, recurrent modules may instead be used to summarize pixels in the vertical direction of the vertical IIR component 102. Unlike fixed-window convolutions, a recurrent module may start processing input as the pixels arrive line by line without having to buffer the lines that are spanned by the fixed-sized window. Therefore, using recurrent modules in the vertical IIR component 102 may reduce the time distance between the input and the output of a model.

For example, the recurrent module used in the vertical IIR component 102 may approximate a simple column-convolution and may not be expected to remember long term dependencies. Therefore, implementing the recurrent module may avoid the use of sophisticated gating mechanisms, as used in long short-term memory (LSTM) or gated recurrent unit (GRU) modules.

The output h may then be processed via the horizontal FIR convolution 104 and the pointwise FIR convolution 106. For example, an FIR convolution may include an FIR filter that has an impulse response that does become exactly zero at times t>T for some finite T, thus being of finite duration. The FIR filter may be thought of a as a fixed sized sliding window on an image. For example, a 3×3 FIR filter may be calculated at one point in an image, then slid to a next point, and calculated again, etc. An FIR filter does not use previously processed output like an IIR filter.

The diagram of FIG. 1 is not intended to indicate that the example hybrid IIR-FIR convolution block 100 is to include all of the components shown in FIG. 1. Rather, the example hybrid IIR-FIR convolution block 100 can be implemented using fewer or additional components not illustrated in FIG. 1 (e.g., additional elements, dimensions, filters, etc.).

Figure 2:
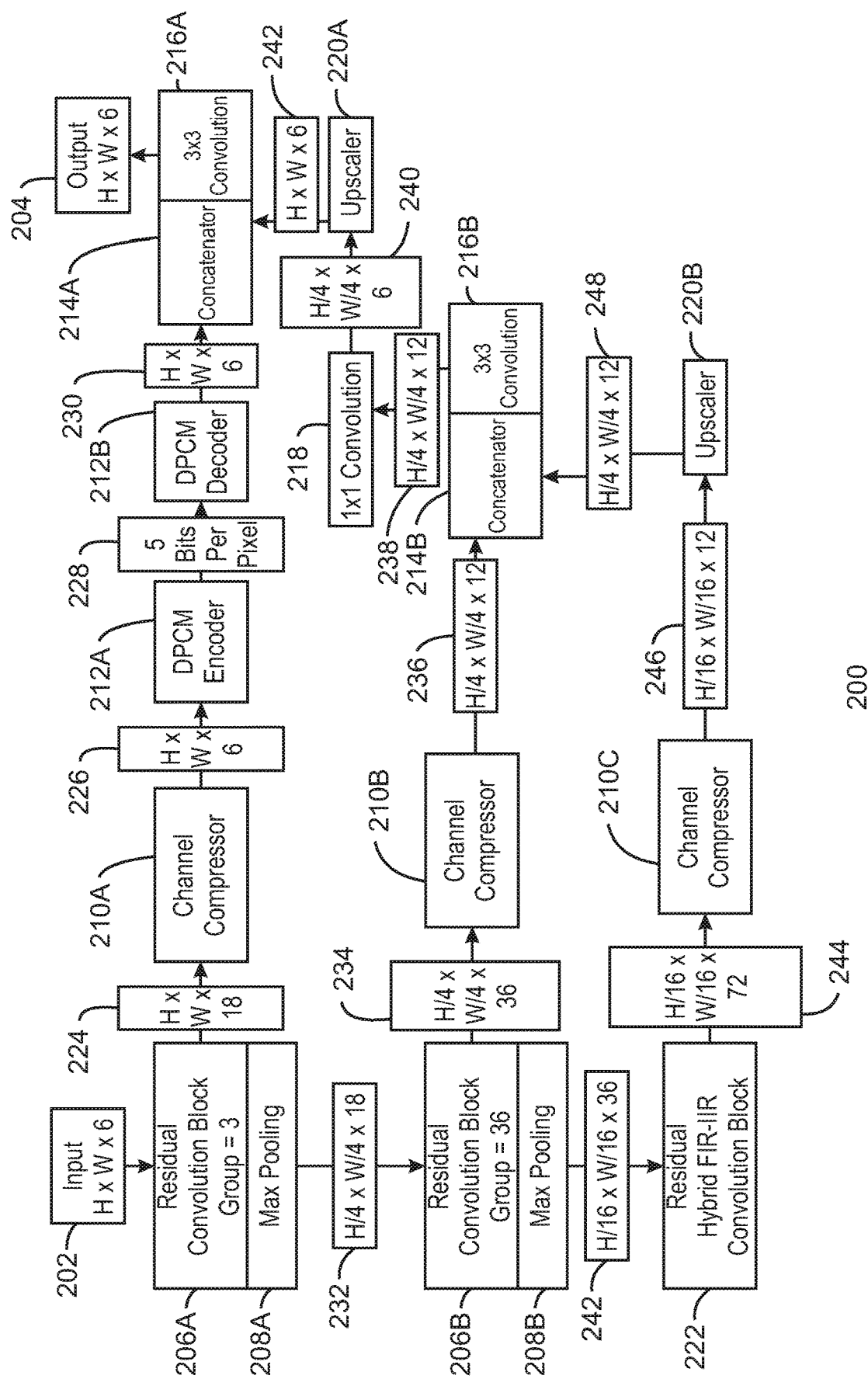
FIG. 2 is a block diagram illustrating an example system for processing images using a hybrid IIR-FIR convolution block.

FIG. 2 is a block diagram illustrating an example system for processing images using a hybrid IIR-FIR convolution block. The example system is referred to generally by the reference number 200 and can be implemented in the computing device 600 below in FIG. 6 using the method 500 of FIG. 5.

The example system 200 receives an input 202 and outputs an output 204. The input 202 and output 204 each include six channels. For example, the input may be two color images each having a resolution of H pixels by W pixels (H×W) and three channels. For example, the channels may be red, green, and blue (RGB) channels. In some examples, the input 202 may be images corresponding to a single point in time or images from different times. For example, the images may be two adjacent frames from a video. In various examples, the two images may be from a right camera and a left camera. The output 204 may be up to six channels of image information, each instance having a resolution of H×W. In various examples, the output 204 of the system 200 can include images, depth maps, feature maps, or any combination thereof. In some examples, six channels can be used to process two RGB images captured by a pair of cameras, two consecutive frames captured by a single camera, or a 6-band multispectral image acquired by single or multiple sensors. As one example, the output 204 may be two color images of resolution H×W with three color channels in each color image, or H×W×3. The use of six channels enables a variety of applications that involve stereo depth, sensor fusion, multispectral imagery, and temporal processing.

The system 200 of FIG. 2 includes a residual convolution block 206A communicatively coupled to a max pooling layer 208A and a channel compression 210A. For example, the residual convolution block 206A has a group count of three. For example, a group convolution having a group of 3 can be thought of as splitting the input channels into three groups and applying K×K×(C/3) convolutions to each group separately, where K is the kernel size. The system 200 includes a resolution convolution block 206B communicatively coupled to the max pooling layer 208A, a max pooling 208B, and a channel compressor 210B. For example, the residual convolution block 206A has a group count of 36. In various examples, where the group number equal to the number of channels, a K×K convolution is applied to each channel separately. The max pooling layers 208A and 208B may be sample-based discretization processes used to downsample input to reduce dimensionality. The system 200 also further includes a differential pulse-code modulation (DPCM) encoder 212A communicatively coupled to the channel compression 210A and a DPCM decoder 212B. The system 200 further includes a concatenator 214A communicatively coupled to the DPCM decoder 212B. The system 200 also further includes a concatenator 214B communicatively coupled to the channel compressor 210B. The system 200 includes a 3×3 convolution 216A communicatively coupled to the concatenator 214A and a 3×3 convolution 216B communicatively coupled to the concatenator 214B. For example, the 3×3 convolution 216A and the 3×3 convolution 216B may be trainable 3×3×C convolution blocks. The system 200 also includes a 1×1 convolution 218 communicatively coupled to the 3×3 convolution 216B. For example, the 1×1 convolution 218 may be a pointwise (1×1×C) convolution. The system 200 further includes an upscaler 220A communicatively coupled to the 1×1 convolution 218 and the concatenator 214A. The system 200 includes an upscaler 220B communicatively coupled to the channel compressor 210C and the concatenator 214B. The system 200 also includes a residual hybrid IIR-FIR convolution block 222 communicatively coupled to the max pooling layer 208B and a channel compressor 210C. For example, the residual hybrid IIR-FIR convolution block 222 may be implemented using the hybrid IIR-FIR convolution block 100 of FIG. 1 as described in FIG. 3.

In the example of FIG. 2, the residual convolution blocks 206A-206C each generate feature maps 224, 234, and 244, respectively, based on different sizes of input. For example, the residual convolution block 206A generates a feature map 224 based on the input 202. The feature map 224 includes eighteen features of H×W resolution. For example, the resolution may be measured in pixels. The max pooling layer 208A downscales the feature map 224 to generate a downscaled feature map of resolution of H/4×W/4 to be processed by the residual convolution block 206B. The residual convolution block 206B generates a feature map 234 including 36 features of H/4×W/4 resolution. Similarly, the max pooling layer 208B downscales the input feature map 234 further to generate a downscaled feature map 242 of resolution H/16×H/16. In the example of FIG. 2, the max-pooling layers 208A and 208B use a stride of 4 to be able to cover a broader range of scales using fewer layers. Reducing the depth of the model using max-pooling layers 208A and 208B may help reduce the hardware footprint for very small silicon area budgets.

In various examples, a hybrid FIR-IIR 222 may be used in bottleneck layers. For example, bottleneck layers may be layers using the coarsest-scale, where the impact of convolution on the overall vertical delay in the system is the largest. For example, a 3×3 filter in the bottleneck of FIG. 2 may cause a 16-line delay as compared to a 1-line delay in the first layer. Furthermore, IIR filters may handle low spatial frequencies well and may thus makes hybrid IIR-FIR filters well suited for the bottleneck layer, which processes low-frequency features. Since the height of the feature maps 242 at the bottleneck layer is also reasonably small, the model may also not have any exploding or vanishing gradient problems.

As shown in FIG. 2, in various examples, the data carried over the skip lines may be compressed to reduce the memory requirement of the model. For example, the number of channels on a skip line buffer may be reduced by using point-wise convolutions, acting as trainable linear projection layers via the channel compressors 210A, 210B, and 210C. For example, the compressors 210A, 210B, and 210C may perform 1×1 conversions on the input feature maps 224, 234, and 244. In some examples, after the channel-wise compression, a DPCM encoder 212A can encode the compressed channels to reduce the number of bits needed to store each pixel on the skip line buffer. In various examples, the DPCM encoding may be used only on the longest skip line. For example, the longest skip line may skip over more blocks than any of the other skip lines. The silicon area cost of the DPCM encoder 212A and DPCM decoder 212B may be negligible as compared to the cost of skip line buffers.

In the example of FIG. 2, the longest skip line is associated with the residual convolution block 206A. Thus, a DPCM encoder 212A may encode the compressed feature map 226 from the channel compressor 210A and generates only five bits per pixel 228 may be stored in the skip line buffer instead of eight bits per pixel. The DPCM decoder 212B may then decode the five bits per pixel to generate a feature map 230 that is sent to the concatenator 214A.

Similarly, the channel compressor 210B may compress the feature map 234 from the residual convolution block 206B and send the compressed feature map 236 to the concatenator 214B. The channel compressor 210C may compress the feature map 244 from the residual hybrid FIR-IIR 222 and generate a feature map 246 with resolution of H/16×W/16 and 12 channels to be sent to the upscaler 220B.

Still referring to FIG. 2, the upscaler 220B may generate a feature map 248 of resolution H/4×W/4 and 12 channels and send the feature map 248 to the concatenator 214B. The concatenator 248 may then concatenate the feature map 248 with the feature map 236. The concatenated result may be processed via the 3×3 convolution 216B to generate a feature map 238 with resolution H/4×W/4 and 12 channels that is then sent to the 1×1 convolution 218.

The 1×1 convolution 218 may convert the feature map 238 into a feature map 240 with a resolution of H/4×W/4 and six channels. The feature map 240 is then sent to the upscaler 220A.

The upscaler 220A upsamples the feature map 240 to generate a feature map 242 with resolution of H×W×6. The concatenator 214A may then concatenate the feature map 242 with the feature map 230 from the DPCM encoder 212B to generate a feature map that is processed by a 3×3 convolution 216A to generate the output 204.

The diagram of FIG. 2 is not intended to indicate that the example system 200 is to include all of the components shown in FIG. 2. Rather, the example system 200 can be implemented using fewer or additional components not illustrated in FIG. 2 (e.g., additional residual convolution blocks, max pooling layers, channel compressors, DPCM encoders, DPCM decoders, concatenators, upscalers, convolutions, resolutions, numbers of channels, numbers of features, etc.).

Figure 3:
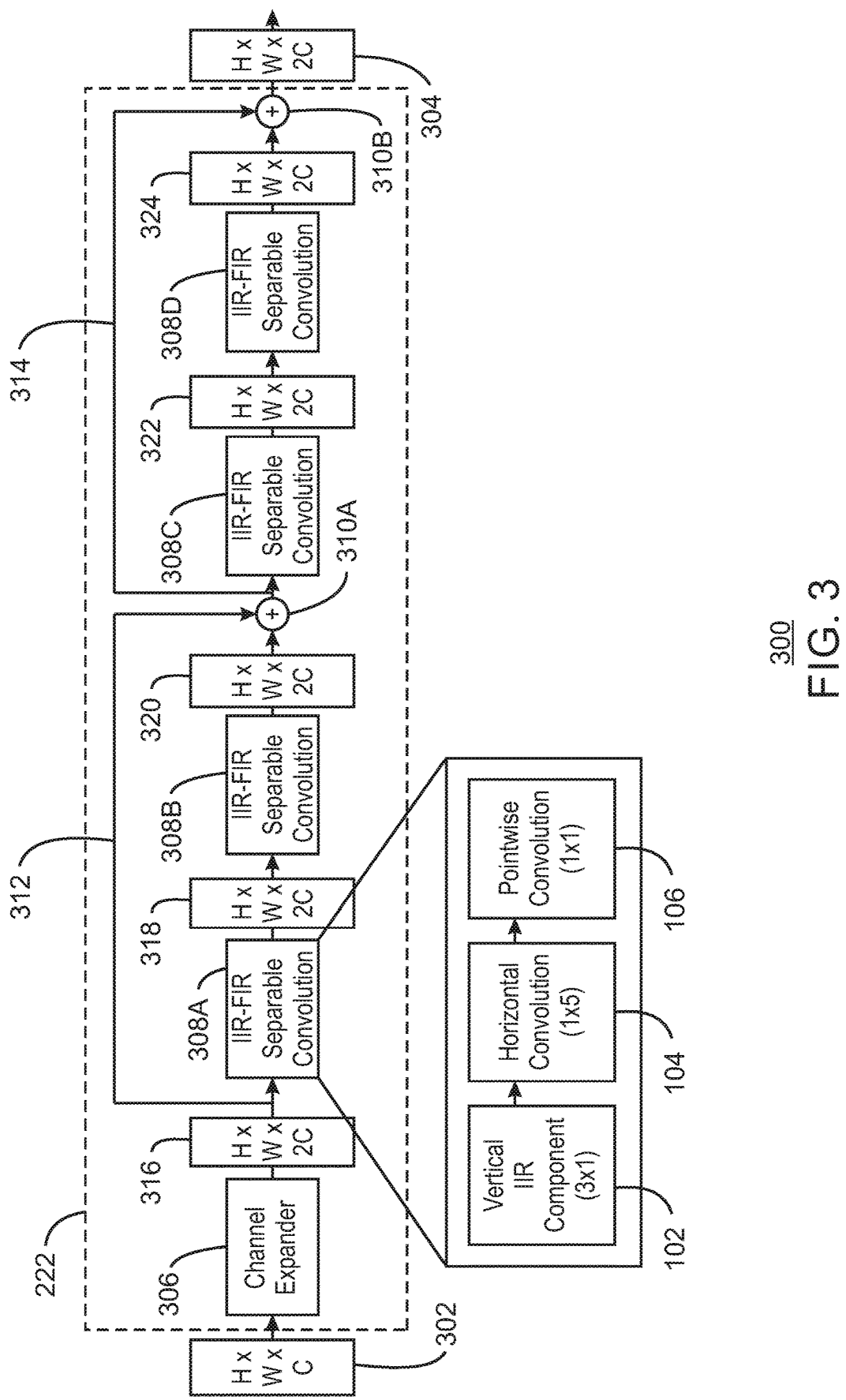
FIG. 3 is a diagram illustrating an example residual hybrid IIR-FIR convolution block for processing images.

FIG. 3 is a block diagram illustrating an example hybrid IIR-FIR convolution block for processing images. The example system is referred to generally by the reference number 300 and can be implemented in the computing device 600 in FIG. 6 using the method 500 of FIG. 5.

The example system 300 includes residual hybrid IIR-FIR convolution block 222 that receives an input 302 of H×W with C channels and outputs an output 304 of H×W with 2C channels. The residual hybrid IIR-FIR convolution block 222 includes a channel expander 306. The residual hybrid IIR-FIR convolution block 222 includes an IIR-FIR separable convolution 308A communicatively coupled to the channel expander 306. The residual hybrid IIR-FIR convolution block 222 includes an IIR-FIR separable convolution 308B communicatively coupled to the IIR-FIR separable convolution 308A. The residual hybrid IIR-FIR convolution block 222 further includes a combiner 310A communicatively coupled to the channel expander 306 and the IIR-FIR separable convolution 308B. The residual hybrid IIR-FIR convolution block 222 also includes an IIR-FIR separable convolution 308C communicatively coupled to the combiner 310A. The residual hybrid IIR-FIR convolution block 222 also further includes an IIR-FIR separable convolution 308D communicatively coupled to the IIR-FIR separable convolution 308C. The residual hybrid IIR-FIR convolution block 222 also further includes a combiner 310B communicatively coupled to the IIR-FIR separable convolution 308D and the combiner 310A. Each of the IIR-FIR separable convolutions 308A-308D include a vertical IIR component 102, a horizontal FIR convolution 104, and a pointwise FIR convolution 106. The residual hybrid IIR-FIR convolution block 222 also includes skip connections 312 and 314 communicatively coupling the channel expander 306 directly to the combiner 310A, and communicatively coupling the combiner 310A directly to the combiner 310B, respectively. The skip connections 312 and 314 may be residual connections used to improve training of the residual hybrid IIR-FIR convolution block 222. For example, during backpropagation of parameters at training, the gradient flow may be improved.

As shown in FIG. 3, an input feature map 302 of resolution H×W and having C channels is received at the channel expander 306. The channel expander 306 doubles the number of channels to generate a feature map 316 with a resolution of H×W and 2C channels. The output feature map 318 is then processed using a first IIR-FIR separable convolution 308A to generate a feature map 320. The feature map 320 is processed by the IIR-FIR separable convolution 308B to generate a feature map 322. The combiner 310A may combine feature map 322 with feature map 318 and send the combined feature map to the IIR-FIR separable convolution 308C. The IIR-FIR separable convolution 308C may generate a feature map 324. The IIR-FIR separable convolution 308D may generate a feature map 326 based on the feature map 324. The combiner 310B may then combine the output of the combiner 310A with the feature map 326 to generate the output 304.

The diagram of FIG. 3 is not intended to indicate that the example system 300 is to include all of the components shown in FIG. 3. Rather, the example system 300 can be implemented using fewer or additional components not illustrated in FIG. 3 (e.g., additional inputs, channels, IIR-FIR separable convolutions, outputs, etc.).

Figure 4:
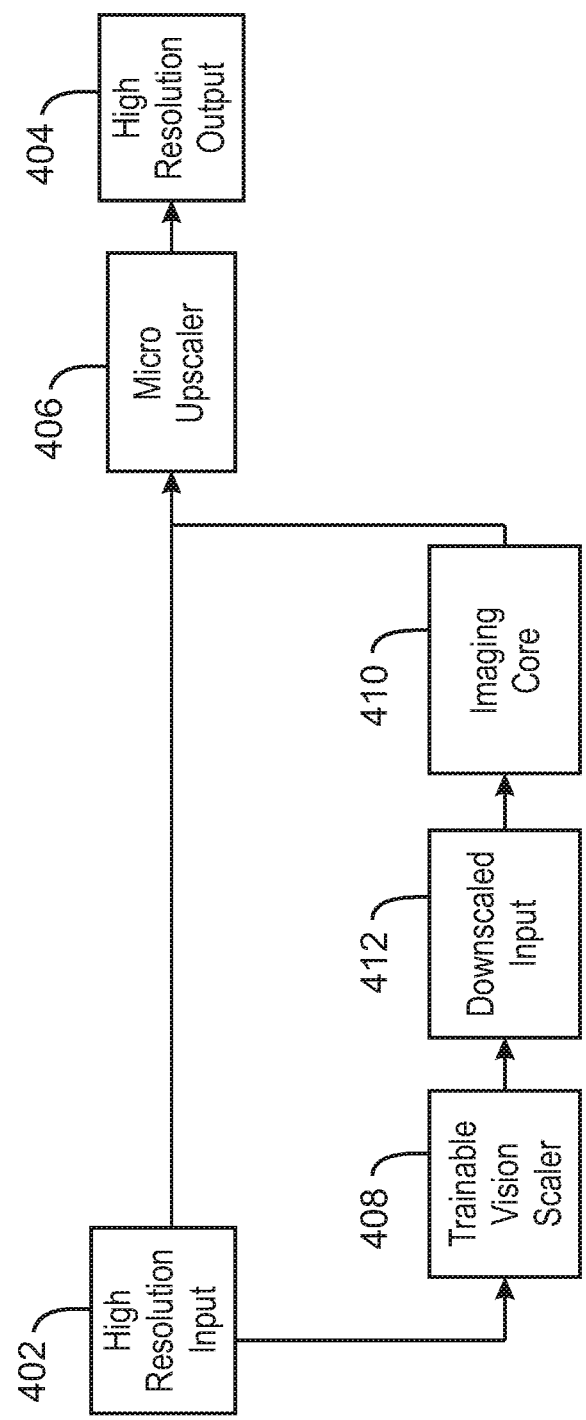
FIG. 4 is a block diagram illustrating an example system for processing high resolution images using a hybrid IIR-FIR convolution block.

FIG. 4 is a block diagram illustrating an example system for processing high resolution images using a hybrid IIR-FIR convolution block. The example system is referred to generally by the reference number 400 and can be implemented in the computing device 600 in FIG. 6 using the method 500 of FIG. 5.

The example system 400 may receive a high resolution input 402 and output a high resolution output 404. The system 400 includes a micro upscaler 406, a Trainable Vision Scaler (TVS) 408, and an imaging core 410 that uses hybrid IIR-FIR convolutions. The micro upscaler 406 is communicatively coupled to the imaging core 410 and may also directly receive the high resolution output 402. The TVS 408 may be a block that outputs H/2×W/2×3 images.

In various examples, the trainable visual scaler (TVS) 408 is content-aware, trainable image downscaler. For example, the TVS 408 may be a trained neural network framework that may serve as a content-aware alternative to simple bilinear scaling.

The hybrid IIR-FIR convolution block 410 can receive downscaled input 412 from the TVS 408 and generate downscaled image information to be upscaled by the micro upscaler 406. For example, the downscaled input 412 may be ×2 downscaled images. As one example, if the high resolution input 402 includes 4k images, then the downscaled input 412 may be full HD images. The downscaled image information may include downscaled images, depth maps, or feature maps.

The micro upscaler 406 can receive downscaled image information from the imaging core 410 and generate high resolution output 404 using the high resolution input 402 as guidance. For example, micro upscaler 406 may be a trained neural network with two inputs. The micro upscaler 406 can thus reduce the cost of running a hybrid IIR-FIR convolution block on high resolution inputs, such as 4K resolution images. In various examples, the micro upscaler 406 is a trainable module that upsamples the output of the imaging core 410 that is performed on downscaled output of a TVS 408, using the original high resolution input 402 as guidance. For example, the micro upscaler 406 can be considered the inverse of the TVS. The micro upscaler 406 can be used together with TVS 408 to enable real-time 4K processing.

The diagram of FIG. 4 is not intended to indicate that the example system 400 is to include all of the components shown in FIG. 4. Rather, the example system 400 can be implemented using fewer or additional components not illustrated in FIG. 4 (e.g., additional downscalers, micro upscalers, types of input or output, etc.).

Figure 5:
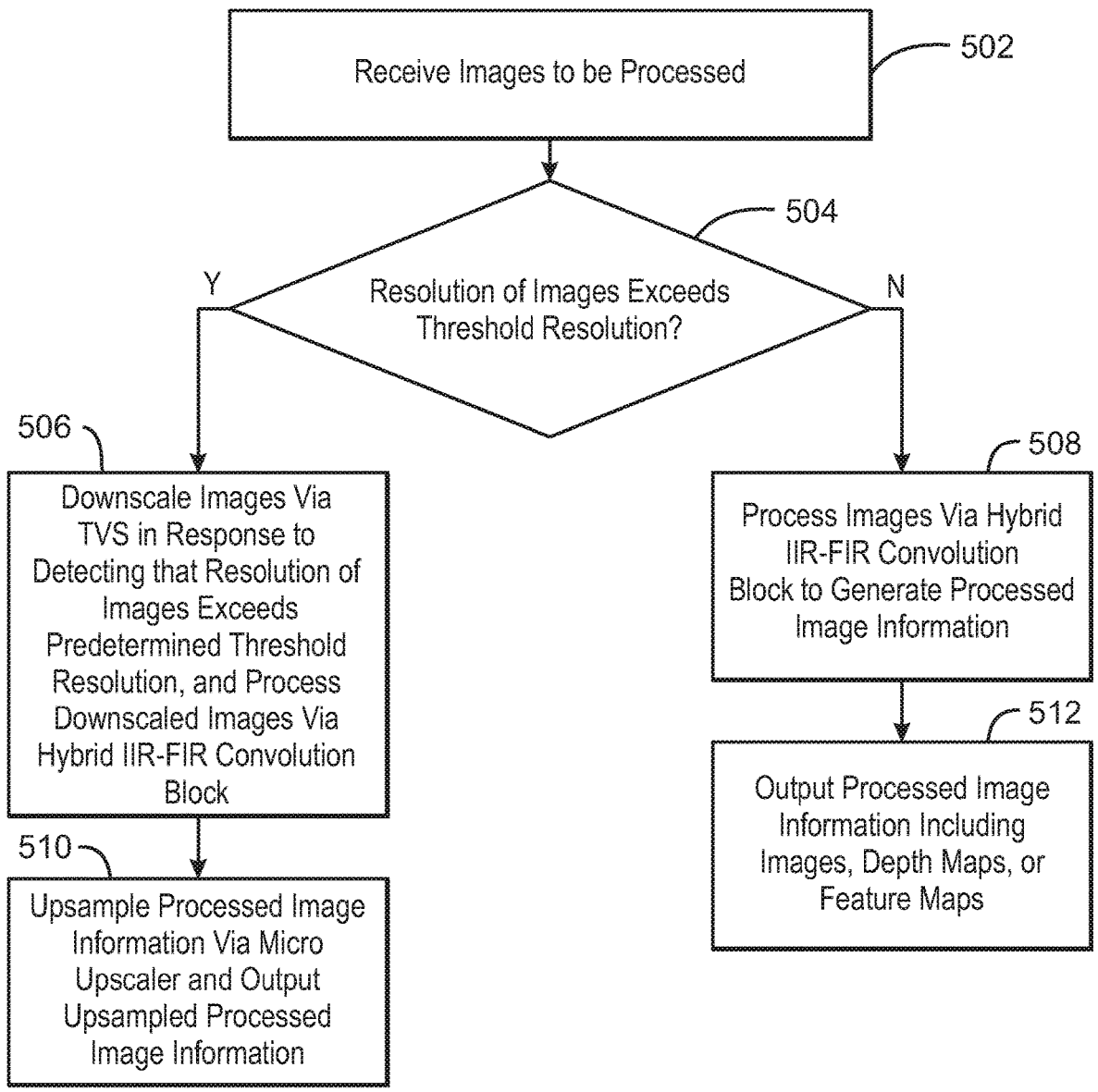
FIG. 5 is a flow chart illustrating a method for processing images using a hybrid IIR-FIR convolution block.

FIG. 5 is a flow chart illustrating a method for processing images using a hybrid IIR-FIR convolution block. The example method 500 can be implemented using the system 200 and the hybrid IIR-FIR convolution block 300 or the image processor 628 of the computing device 600 in FIG. 6, or the computer readable media 700 of FIG. 7.

At block 502, images to be processed are received. For example, the images may include RGB images, video frames, R-CCC images, black and white images. In some examples, the input may be up to six channels of any combination of image information.

At block 504, a determination is made as to whether a resolution of the images exceeds a threshold resolution. For example, each image may be analyzed to determine if the threshold resolution is exceeded by the image. If the image is detected to exceed the threshold resolution, then the method may proceed at block 506. If the image does not exceed the threshold resolution, then the method may proceed at block 508.

At block 506, the images are downscaled, via a trainable vision scaler (TVS), in response to detecting that a resolution of the received image exceeds a predetermined threshold resolution, and the downscaled images are processed via a hybrid IIR-FIR convolution block. For example, the threshold resolution may be 4k or any other suitable threshold. The hybrid IIR-FIR convolution block may have an approximated vertical convolution. In various examples, the downscaled images may be processed similar any of the manners in which images are processed in block 508.

At block 508, the images are processed via a hybrid infinite impulse response—finite impulse response (IIR-FIR) convolution block with an approximated vertical convolution to generate processed image information. In some examples, processing the images may include denoising the images. In various examples, processing the images may include deblurring the image. In some examples, processing the image may include recover missing color information from context in the images. For example, if a pixel is detected as located in the sky, then it can be inferred to be blue. In various examples, processing the images may include demosaicing the images. In some examples, processing the images may include spatially varying exposure levels in the images.

At block 510, the processed image information is upsampled, via a micro upscaler, and the upsampled processed image information is output. Thus, if the images were downscaled at block 504, then the processed image information may be upsampled to generate images, depth maps, or feature maps with the same resolution as the processed image information of block 508.

At block 512, processed image information including an image, a depth map, or a feature map is output. In some examples, up to six channels of any combination of processed image information may be output.

This process flow diagram is not intended to indicate that the blocks of the example method 500 are to be executed in any particular order, or that all of the blocks are to be included in every case. For example, block 504 may not be included if the threshold resolution is never exceeded. Further, any number of additional blocks not shown may be included within the example method 500, depending on the details of the specific implementation. For example, the processed image information may be used in various computer vision tasks.

Figure 6:
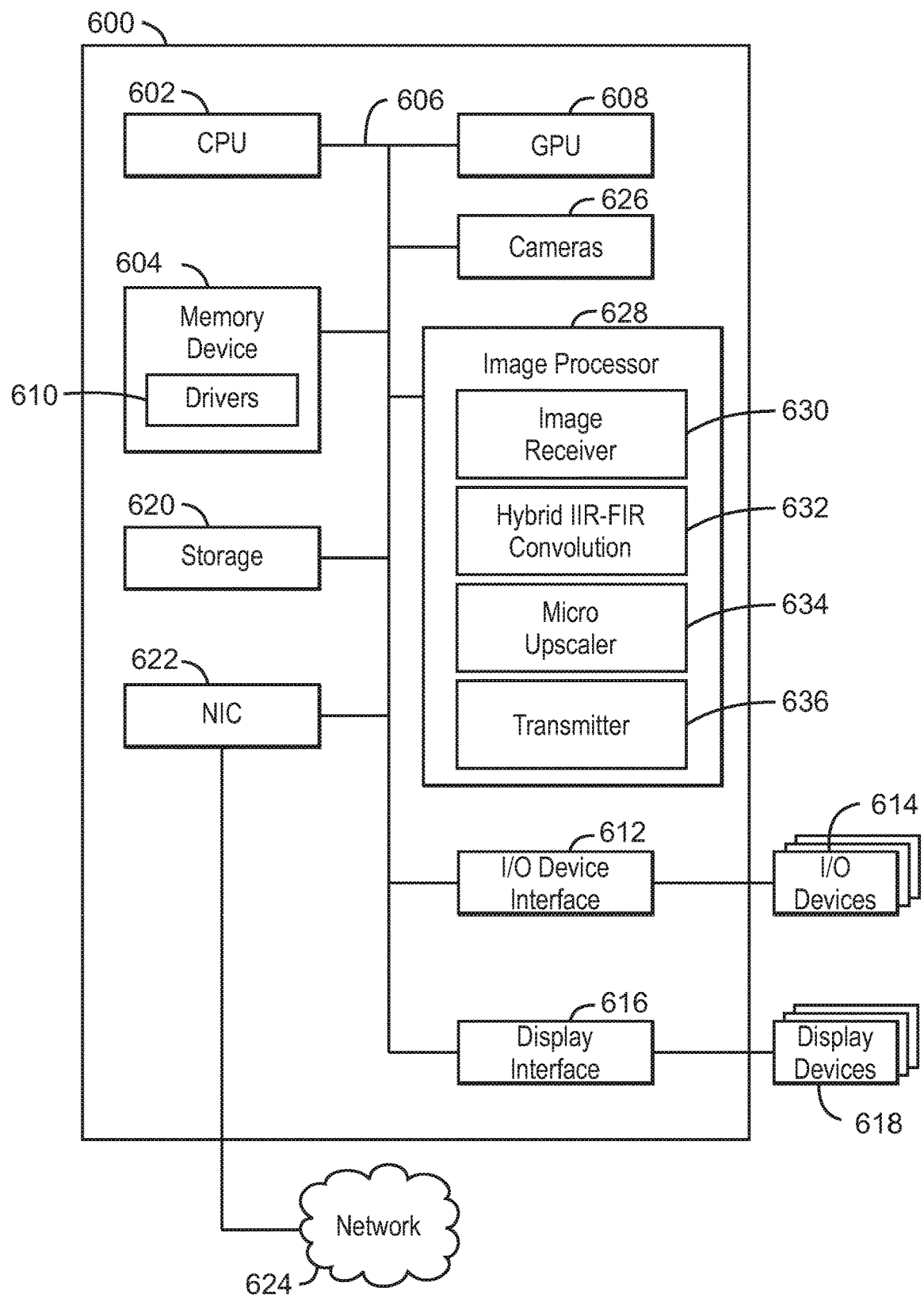
FIG. 6 is block diagram illustrating an example computing device that can process images using a hybrid IIR-FIR convolution block.

Referring now to FIG. 6, a block diagram is shown illustrating an example computing device that can process images using a hybrid IIR-FIR convolution block. The computing device 600 may be, for example, a laptop computer, desktop computer, tablet computer, mobile device, or wearable device, among others. In some examples, the computing device 600 may be a security camera or a computing device of a vehicle, such as an automobile. The computing device 600 may include a central processing unit (CPU) 602 that is configured to execute stored instructions, as well as a memory device 604 that stores instructions that are executable by the CPU 602. The CPU 602 may be coupled to the memory device 604 by a bus 606. Additionally, the CPU 602 can be a single core processor, a multi-core processor, a computing cluster, or any number of other configurations. Furthermore, the computing device 600 may include more than one CPU 602. In some examples, the CPU 602 may be a system-on-chip (SoC) with a multi-core processor architecture. In some examples, the CPU 602 can be a specialized digital signal processor (DSP) used for image processing. The memory device 604 can include random access memory (RAM), read only memory (ROM), flash memory, or any other suitable memory systems. For example, the memory device 604 may include dynamic random access memory (DRAM).

The memory device 604 can include random access memory (RAM), read only memory (ROM), flash memory, or any other suitable memory systems. For example, the memory device 604 may include dynamic random access memory (DRAM).

The computing device 600 may also include a graphics processing unit (GPU) 608. As shown, the CPU 602 may be coupled through the bus 606 to the GPU 608. The GPU 608 may be configured to perform any number of graphics operations within the computing device 600. For example, the GPU 608 may be configured to render or manipulate graphics images, graphics frames, videos, or the like, to be displayed to a user of the computing device 600.

The memory device 604 can include random access memory (RAM), read only memory (ROM), flash memory, or any other suitable memory systems. For example, the memory device 604 may include dynamic random access memory (DRAM). The memory device 604 may include device drivers 610 that are configured to execute the instructions for generating processed image information using a hybrid IIR-FIR convolution block. The device drivers 610 may be software, an application program, application code, or the like.

The CPU 602 may also be connected through the bus 606 to an input/output (I/O) device interface 612 configured to connect the computing device 600 to one or more I/O devices 614. The I/O devices 614 may include, for example, a keyboard and a pointing device, wherein the pointing device may include a touchpad or a touchscreen, among others. The I/O devices 614 may be built-in components of the computing device 600, or may be devices that are externally connected to the computing device 600. In some examples, the memory 604 may be communicatively coupled to I/O devices 614 through direct memory access (DMA).

The CPU 602 may also be linked through the bus 606 to a display interface 616 configured to connect the computing device 600 to a display device 618. The display device 618 may include a display screen that is a built-in component of the computing device 600. The display device 618 may also include a computer monitor, television, or projector, among others, that is internal to or externally connected to the computing device 600.

The computing device 600 also includes a storage device 620. The storage device 620 is a physical memory such as a hard drive, an optical drive, a thumbdrive, an array of drives, a solid-state drive, or any combinations thereof. The storage device 620 may also include remote storage drives.

The computing device 600 may also include a network interface controller (NIC) 622. The NIC 622 may be configured to connect the computing device 600 through the bus 606 to a network 624. The network 624 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 600 further includes cameras 626. In some examples, the cameras may include a processor to generate depth information. For example, the cameras 626 may include a left camera and a right camera. In some examples, the cameras 626 may include an RGB camera, an R-CCC camera, an infrared camera, a depth camera, among other types of cameras. For example, the cameras may include one or more depth sensors.

The computing device 600 further includes an image processor 628. In some examples, the image processor 628 may be a fully pipelined inline hardware device trainable to perform any number of image processing tasks. For example, the image processor 628 can be used to process images in real time. The image processor 628 can include an image receiver 630, a Hybrid IIR-FIR convolution 632, a micro upscaler 634, and a transmitter 636. In some examples, each of the components 630-644 of the image processor 628 may be a microcontroller, embedded processor, or software module. The image receiver 630 can receive images to be processed. In some examples, the received images may include up to six channels of image information. The hybrid IIR-FIR convolution 632 can generate processed image information based on the received images. In some examples, the hybrid IIR-FIR convolution 632 includes a vertical infinite impulse response (IIR) component to approximate a vertical convolution when processing the image. For example, the vertical infinite impulse response (IIR) component may be a spatially-recurrent neural network. In various examples, the hybrid IIR-FIR convolution 632 includes a horizontal finite impulse response (FIR) convolution. In some examples, the hybrid IIR-FIR convolution 632 includes pointwise FIR convolution. The micro upscaler 634 can process high resolution images. For example, the micro upscaler 634 can detect an image has a resolution that exceeds a threshold and downscale the image. In some examples, the micro upscaler 634 can include a trainable vision scaler to downscale the images. The downscaled images can then be processed by the hybrid IIR-FIR convolution 632 to generate downscaled processed image information. In some examples, the micro upscaler 634 can upsample downscaled processed image information from the hybrid IIR-FIR convolution 632. The transmitter 636 may output up to six channels of processed image information.

The block diagram of FIG. 6 is not intended to indicate that the computing device 600 is to include all of the components shown in FIG. 6. Rather, the computing device 600 can include fewer or additional components not illustrated in FIG. 6, such as additional buffers, additional processors, and the like. The computing device 600 may include any number of additional components not shown in FIG. 6, depending on the details of the specific implementation. For example, the image processor 628 can include a max pooling layer to perform a 4× downscaling of feature maps. In some examples, the image processor 628 can include a channel compressor to reduce a number of bits to be stored in a skip line buffer. In various examples, the image processor 628 can include a differential pulse-code modulation (DPCM) encoder to compress skip lines in a neural network. Furthermore, any of the functionalities of the image receiver 630, the Hybrid IIR-FIR convolution 632, the micro upscaler 634, and the transmitter 636, may be partially, or entirely, implemented in hardware and/or in the processor 602. For example, the functionality may be implemented with an application specific integrated circuit, in logic implemented in the processor 602, or in any other device. In addition, any of the functionalities of the CPU 602 may be partially, or entirely, implemented in hardware and/or in a processor. For example, the functionality of the image processor 628 may be implemented with an application specific integrated circuit, in logic implemented in a processor, in logic implemented in a specialized graphics processing unit such as the GPU 608, or in any other device.

Figure 7:
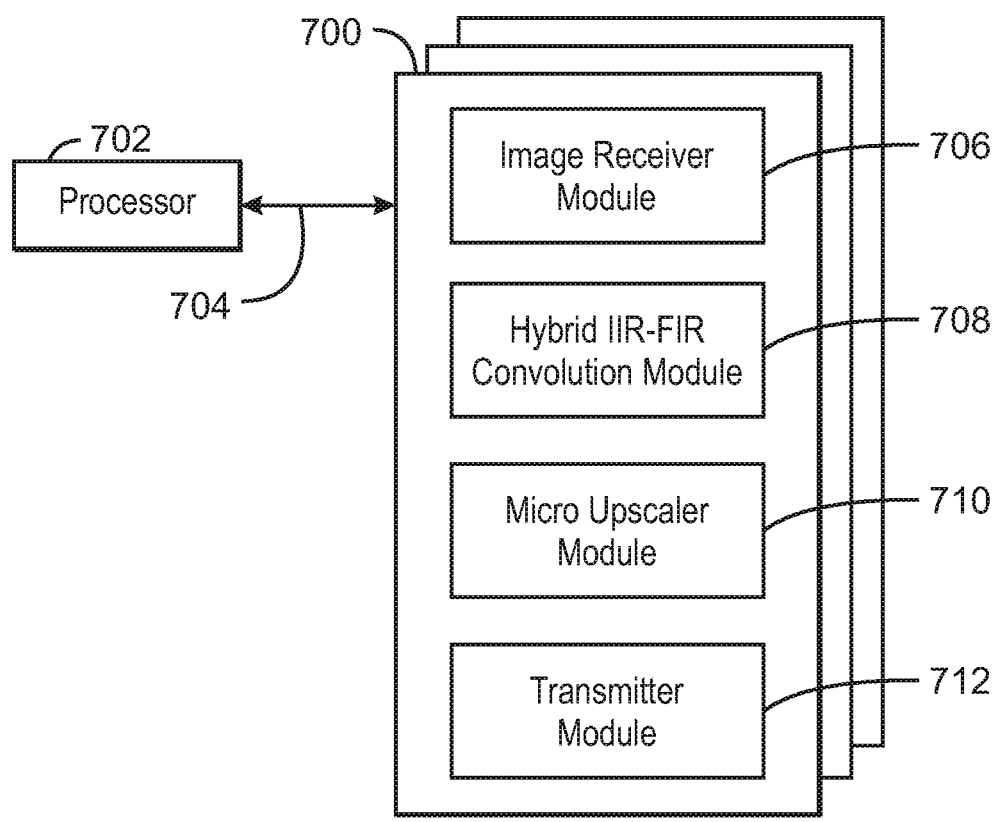
FIG. 7 is a block diagram showing computer readable media that store code for processing images using a hybrid IIR-FIR convolution block.

FIG. 7 is a block diagram showing computer readable media 700 that store code for processing images using a hybrid IIR-FIR convolution block. The computer readable media 700 may be accessed by a processor 702 over a computer bus 704. Furthermore, the computer readable medium 700 may include code configured to direct the processor 702 to perform the methods described herein. In some embodiments, the computer readable media 700 may be non-transitory computer readable media. In some examples, the computer readable media 700 may be storage media.

The various software components discussed herein may be stored on one or more computer readable media 700, as indicated in FIG. 7. For example, an image receiver module 706 may be configured to receiving an image to be processed. A hybrid IIR-FIR convolution module 708 may be configured to process the image with an approximated vertical convolution to generate processed image information. In some examples, the hybrid IIR-FIR convolution module 708 may be configured to process the downscaled image to generate the processed image information. In various examples, the hybrid IIR-FIR convolution module 708 may be configured to denoise images. In some examples, the hybrid IIR-FIR convolution module 708 may be configured to deblur images. In various examples, the hybrid IIR-FIR convolution module 708 may be configured to recover missing color information from context in images. In some examples, the hybrid IIR-FIR convolution module 708 may be configured to demosaic images. In various examples, the hybrid IIR-FIR convolution module 708 may be configured to spatially varying exposure levels in images. A micro upscaler module 710 may be configured to downscale the image in response to detecting that a resolution of the received image exceeds a predetermined threshold. For example, the micro upscaler module 710 may be configured to upsample the processed image information. A transmitter module 712 may be configured to output processed image information including an image, a depth map, or a feature map.

The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation. For example, the computer readable media 700 may include instructions to encode a feature map using differential pulse-code modulation (DPCM) to compress skip lines in a neural network. In some examples, the computer readable media 700 may include instructions to compress a feature map to reduce a number of bits to be stored in a skip line buffer. In various examples, the computer readable media 700 may include instructions to perform a 4× downscaling of feature maps.

EXAMPLES

Example 1 is a system for processing images. The system includes a hybrid infinite impulse response—finite impulse response (IIR-FIR) convolution block to receive an image and generate processed image information. The hybrid IIR-FIR convolution block includes a vertical infinite impulse response (IIR) component to approximate a vertical convolution when processing the image.

Example 2 includes the system of example 1, including or excluding optional features. In this example, the hybrid IIR-FIR convolution block includes a horizontal finite impulse response (FIR) convolution.

Example 3 includes the system of any one of examples 1 to 2, including or excluding optional features. In this example, the hybrid IIR-FIR convolution block includes a pointwise FIR convolution.

Example 4 includes the system of any one of examples 1 to 3, including or excluding optional features. In this example, the vertical IIR component includes a spatially-recurrent neural network.

Example 5 includes the system of any one of examples 1 to 4, including or excluding optional features. In this example, the system includes a max pooling layer to perform a 4× downscaling of feature maps.

Example 6 includes the system of any one of examples 1 to 5, including or excluding optional features. In this example, the system includes a channel compressor to reduce a number of bits to be stored in a skip line buffer.

Example 7 includes the system of any one of examples 1 to 6, including or excluding optional features. In this example, the system includes a differential pulse-code modulation (DPCM) encoder to compress skip lines in a neural network.

Example 8 includes the system of any one of examples 1 to 7, including or excluding optional features. In this example, the system includes a trainable vision scaler to downscale the image in response to detecting that a resolution of the image exceeds a threshold.

Example 9 includes the system of any one of examples 1 to 8, including or excluding optional features. In this example, the system is to receive six channels of image information and output up to six channels of processed image information.

Example 10 includes the system of any one of examples 1 to 9, including or excluding optional features. In this example, the system includes a fully pipelined inline hardware device trainable to perform a number of image processing tasks.

Example 11 is a method for processing images. The method includes receiving, via a processor, an image to be processed; processing, via a hybrid infinite impulse response—finite impulse response (IIR-FIR) convolution block with an approximated vertical convolution, the image to generate processed image information. The method also includes outputting, via the processor, processed image information including an image, a depth map, or a feature map.

Example 12 includes the method of example 11, including or excluding optional features. In this example, the method includes downscaling the image, via a trainable vision scaler, and upsampling the processed image information, via a micro upscaler, in response to detecting that a resolution of the received image exceeds a predetermined threshold.

Example 13 includes the method of any one of examples 11 to 12, including or excluding optional features. In this example, the method includes encoding a feature map using differential pulse-code modulation (DPCM) to compress skip lines in a neural network.

Example 14 includes the method of any one of examples 11 to 13, including or excluding optional features. In this example, the method includes compressing a feature map to reduce a number of bits to be stored in a skip line buffer.

Example 15 includes the method of any one of examples 11 to 14, including or excluding optional features. In this example, the method includes performing a 4× downscaling of a feature map.

Example 16 includes the method of any one of examples 11 to 15, including or excluding optional features. In this example, processing the image includes denoising the image.

Example 17 includes the method of any one of examples 11 to 16, including or excluding optional features. In this example, processing the image includes deblurring the image.

Example 18 includes the method of any one of examples 11 to 17, including or excluding optional features. In this example, processing the image includes recovering missing color information from context in the image.

Example 19 includes the method of any one of examples 11 to 18, including or excluding optional features. In this example, processing the image includes demosaicing the image.

Example 20 includes the method of any one of examples 11 to 19, including or excluding optional features. In this example, processing the image includes spatially varying exposure levels in the image.

Example 21 is an apparatus for processing images. The apparatus includes a hybrid infinite impulse response-finite impulse response (IIR-FIR) convolution block to receive an image and generate processed image information. The hybrid IIR-FIR convolution block includes a vertical infinite impulse response (IIR) component to approximate a vertical convolution when processing the image.

Example 22 includes the apparatus of example 21, including or excluding optional features. In this example, the hybrid IIR-FIR convolution block includes a horizontal finite impulse response (FIR) convolution.

Example 23 includes the apparatus of any one of examples 21 to 22, including or excluding optional features. In this example, the hybrid IIR-FIR convolution block includes a pointwise FIR convolution.

Example 24 includes the apparatus of any one of examples 21 to 23, including or excluding optional features. In this example, the vertical IIR component includes a spatially-recurrent neural network.

Example 25 includes the apparatus of any one of examples 21 to 24, including or excluding optional features. In this example, the apparatus includes a max pooling layer to perform a 4× downscaling of feature maps.

Example 26 includes the apparatus of any one of examples 21 to 25, including or excluding optional features. In this example, the apparatus includes a channel compressor to reduce a number of bits to be stored in a skip line buffer.

Example 27 includes the apparatus of any one of examples 21 to 26, including or excluding optional features. In this example, the apparatus includes a differential pulse-code modulation (DPCM) encoder to compress skip lines in a neural network.

Example 28 includes the apparatus of any one of examples 21 to 27, including or excluding optional features. In this example, the apparatus includes a trainable vision scaler to downscale the image in response to detecting that a resolution of the image exceeds a threshold.

Example 29 includes the apparatus of any one of examples 21 to 28, including or excluding optional features. In this example, the apparatus is to receive six channels of image information and output up to six channels of processed image information.

Example 30 includes the apparatus of any one of examples 21 to 29, including or excluding optional features. In this example, the apparatus includes a fully pipelined inline hardware device trainable to perform a number of image processing tasks.

Example 31 is a system for processing images. The system includes means for receiving an image and generate processed image information. The means for receiving the image includes means for approximating a vertical convolution when processing the image.

Example 32 includes the system of example 31, including or excluding optional features. In this example, the means for receiving the image includes a horizontal finite impulse response (FIR) convolution.

Example 33 includes the system of any one of examples 31 to 32, including or excluding optional features. In this example, the means for receiving the image includes a pointwise FIR convolution.

Example 34 includes the system of any one of examples 31 to 33, including or excluding optional features. In this example, the means for approximating the vertical convolution includes a spatially-recurrent neural network.

Example 35 includes the system of any one of examples 31 to 34, including or excluding optional features. In this example, the system includes means for performing a 4× downscaling of feature maps.

Example 36 includes the system of any one of examples 31 to 35, including or excluding optional features. In this example, the system includes means for reducing a number of bits to be stored in a skip line buffer.

Example 37 includes the system of any one of examples 31 to 36, including or excluding optional features. In this example, the system includes means for compressing skip lines in a neural network.

Example 38 includes the system of any one of examples 31 to 37, including or excluding optional features. In this example, the system includes means for downscaling the image in response to detecting that a resolution of the image exceeds a threshold.

Example 39 includes the system of any one of examples 31 to 38, including or excluding optional features. In this example, the system includes means for receiving six channels of image information and outputting up to six channels of processed image information.

Example 40 includes the system of any one of examples 31 to 39, including or excluding optional features. In this example, the system includes means for performing a number of image processing tasks.

Example 41 is at least one computer readable medium for processing images having instructions stored therein that. The computer-readable medium includes instructions that direct the processor to receive an image to be processed. The computer-readable medium also includes instructions that direct the processor to process the image with an approximated vertical convolution to generate processed image information. The computer-readable medium further includes instructions that direct the processor to output processed image information including an image, a depth map, or a feature map.

Example 42 includes the computer-readable medium of example 41, including or excluding optional features. In this example, the computer-readable medium includes instructions to: downscale the image in response to detecting that a resolution of the received image exceeds a predetermined threshold; process the downscaled image to generate the processed image information; and upsample the processed image information.

Example 43 includes the computer-readable medium of any one of examples 41 to 42, including or excluding optional features. In this example, the computer-readable medium includes instructions to encode a feature map using differential pulse-code modulation (DPCM) to compress skip lines in a neural network.

Example 44 includes the computer-readable medium of any one of examples 41 to 43, including or excluding optional features. In this example, the computer-readable medium includes instructions to compress a feature map to reduce a number of bits to be stored in a skip line buffer.

Example 45 includes the computer-readable medium of any one of examples 41 to 44, including or excluding optional features. In this example, the computer-readable medium includes instructions to perform a 4× downscaling of feature maps.

Example 46 includes the computer-readable medium of any one of examples 41 to 45, including or excluding optional features. In this example, the computer-readable medium includes instructions to denoise the image.

Example 47 includes the computer-readable medium of any one of examples 41 to 46, including or excluding optional features. In this example, the computer-readable medium includes instructions to deblur the image.

Example 48 includes the computer-readable medium of any one of examples 41 to 47, including or excluding optional features. In this example, the computer-readable medium includes instructions to recover missing color information from context in the image.

Example 49 includes the computer-readable medium of any one of examples 41 to 48, including or excluding optional features. In this example, the computer-readable medium includes instructions to demosaic the image.

Example 50 includes the computer-readable medium of any one of examples 41 to 49, including or excluding optional features. In this example, the computer-readable medium includes instructions to spatially vary exposure levels in the image.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for processing images, the apparatus comprising:
    at least one memory;
    instructions; and
    processor circuitry to execute the instructions to implement:
        a hybrid infinite impulse response-finite impulse response (IIR-FIR) convolution to process an image to generate processed image information, the hybrid IIR-FIR convolution including a vertical infinite impulse response (IIR) component to approximate a vertical convolution; and
        at least one of a channel compressor or a differential pulse-code modulation (DPCM) encoder, the channel compressor to reduce a number of bits to be stored in a skip line buffer, the DPCM encoder to compress skip lines in a neural network.

2. The apparatus of claim 1, wherein the hybrid IIR-FIR convolution includes a horizontal finite impulse response (FIR) convolution.

3. The apparatus of claim 1, wherein the hybrid IIR-FIR convolution includes a pointwise FIR convolution.

4. The apparatus of claim 1, wherein the vertical IIR component is implemented by a spatially-recurrent neural network.

5. The apparatus of claim 1, wherein the processor circuitry is to implement a max pooling layer to perform a downscaling of feature maps by a factory of four.

6. The apparatus of claim 1, wherein the processor circuitry is to implement a trainable vision scaler to downscale the image in response to detecting that a resolution of the image exceeds a threshold.

7. The apparatus of claim 1, wherein the apparatus is to receive six channels of image information and output up to six channels of processed image information.

8. The apparatus of claim 1, wherein the apparatus includes a fully pipelined inline hardware device trainable to perform a plurality of image processing tasks.

9. A method for processing images, the method comprising:
    processing an image with a hybrid infinite impulse response-finite impulse response (IIR-FIR) convolution to generate processed image information, the hybrid IIR-FIR convolution including an approximated vertical convolution;
    at least one of encoding a feature map or compressing the feature map, the feature map included in the processed image information, the encoding of the feature map using differential pulse-code modulation (DPCM) to compress skip lines in a neural network, the compressing of the feature map to reduce a number of bits to be stored in a skip line buffer; and
    outputting, with a processor, the processed image information.

10. The method of claim 9, further including downscaling the image with a trainable vision scaler and upsampling the processed image information with a micro upscaler in response to detecting that a resolution of the image exceeds a predetermined threshold.

11. The method of claim 9, further including performing a downscaling of the feature map by a factory of four.

12. The method of claim 9, wherein the processing of the image includes denoising the image.

13. The method of claim 9, wherein the processing of the image includes deblurring the image.

14. The method of claim 9, wherein the processing of the image includes missing color information from context in the image.

15. The method of claim 9, wherein the processing of the image includes demosaicing the image.

16. The method of claim 9, wherein the processing of the image includes spatially varying exposure levels in the image.

17. An article of manufacture including at least one memory device, the article of manufacture comprising instructions that, when executed, cause a computing device to at least:
    process an image with an approximated vertical convolution to generate processed image information;
    at least one of (i) encode a feature map using differential pulse-code modulation (DPCM) to compress skip lines in a neural network, or (ii) compress the feature map to reduce a number of bits to be stored in a skip line buffer, the feature map included in the processed image information; and
    output the processed image information.

18. The article of manufacture of claim 17, wherein the instructions cause the computing device to:
    downscale the image in response to detecting that a resolution of the image exceeds a predetermined threshold;
    process the downscaled image to generate the processed image information; and
    upsample the processed image information.

19. The article of manufacture of claim 17, wherein the instructions cause the computing device to perform a downscaling of feature maps by a factory of four.

* * * * *

UNITED STATES PATENT AND TRADEMARK OFFICE
CERTIFICATE OF CORRECTION

PATENT NO. : 11,302,035 B2
APPLICATION NO. : 16/674512
DATED : April 12, 2022
INVENTOR(S) : Asama et al.

It is certified that error appears in the above-identified patent and that said Letters Patent is hereby corrected as shown below:

On the Title Page

Item (54), replace "(TTR)" with -- (IIR) --.

In the Specification

Column 1, Line 2, replace "(TTR)" with -- (IIR) --.

Signed and Sealed this
Twenty-ninth Day of August, 2023

Katherine Kelly Vidal
*Director of the United States Patent and Trademark Office*